(12) United States Patent
James et al.

(10) Patent No.: US 7,785,000 B2
(45) Date of Patent: Aug. 31, 2010

(54) VENTING SYSTEM FOR DRYWELL CALIBRATORS

(75) Inventors: Kyle D. James, Orem, UT (US); Scott M. Hampton, Lehi, UT (US); Michael W. Hirst, Lindon, UT (US)

(73) Assignee: Fluke Corporation, Everett, WA (US)

( * ) Notice: Subject to any disclaimer, the term of this patent is extended or adjusted under 35 U.S.C. 154(b) by 316 days.

(21) Appl. No.: 11/853,724

(22) Filed: Sep. 11, 2007

(65) Prior Publication Data

US 2009/0064603 A1    Mar. 12, 2009

(51) Int. Cl.
*G01K 15/00* (2006.01)
*G01K 1/14* (2006.01)
*G01K 1/16* (2006.01)

(52) U.S. Cl. .............................. 374/1; 374/208; 374/5; 702/99

(58) Field of Classification Search ................ 374/1–3, 374/100, 29, 31–33, 39, 4, 5, 30, 208, E19.001, 374/E15.001; 73/1.01; 422/51; 702/99; 420/528, 530, 469, 471, 473, 475, 476, 479, 420/480, 481, 482, 478, 490, 499, 486, 487, 420/489, 491, 496, 493
See application file for complete search history.

(56) References Cited

U.S. PATENT DOCUMENTS

| | | | | |
|---|---|---|---|---|
| 3,699,800 A | * | 10/1972 | Waldron | 374/1 |
| 3,738,174 A | * | 6/1973 | Waldron | 374/173 |
| 4,079,618 A | * | 3/1978 | King | 374/1 |
| 4,901,257 A | * | 2/1990 | Chang et al. | 702/99 |
| 5,792,951 A | * | 8/1998 | Ismail et al. | 73/204.11 |
| 5,929,333 A | * | 7/1999 | Nair | 73/204.11 |
| 6,193,411 B1 | * | 2/2001 | Chen | 374/2 |
| 7,561,058 B2 | * | 7/2009 | Farley et al. | 340/635 |
| 7,607,309 B2 | * | 10/2009 | Liebmann et al. | 62/3.3 |
| 2007/0206653 A1 | * | 9/2007 | Nakano et al. | 374/1 |
| 2007/0291814 A1 | | 12/2007 | Hirst | 374/1 |

FOREIGN PATENT DOCUMENTS

| | | | |
|---|---|---|---|
| DE | 2002005006710 | * | 8/2005 |
| FR | 2616541 | | 6/1987 |
| FR | 2920910 | * | 3/2009 |
| GB | 2376526 | | 12/2002 |
| RO | 83881 A | * | 5/1984 |
| SU | 482816 A | * | 12/1975 |
| WO | WO 9960355 A1 | * | 11/1999 |

* cited by examiner

*Primary Examiner*—Gail Verbitsky
(74) *Attorney, Agent, or Firm*—Dorsey & Whitney LLP

(57) ABSTRACT

In one aspect of the invention a drywell includes a heated receiver for receiving a temperature probe. The receiver has upper and lower ends and an inner shield positioned around the receiver to define a first air channel extending between the upper and lower ends. A flow plate is positioned above the upper end of the receiver and extends outwardly from the receiver. The flow plate defines a plate opening positioned over the receiver opening and has a lower surface sloping away from the receiver with distance above the receiver. A blower positioned below the lower end of the receiver induces air flow through the air channel. The lower surface of the flow plate directs the air flow away from the temperature probe.

28 Claims, 6 Drawing Sheets

VENTING SYSTEM FOR DRYWELL CALIBRATORS

TECHNICAL FIELD

This invention relates to drywell calibrators and, more particularly, to cooling systems for drywell calibrators.

BACKGROUND OF THE INVENTION

It is typical for thermometers and thermal switches to be calibrated using a drywell. Drywells may include a receiver in which a thermometer or thermal switch is inserted. A heating element and temperature sensor are in thermal contact with the receiver such that the temperature within the receiver may be accurately set. The set temperature of the drywell may then be compared to the readout temperature of the thermometer or the switching temperature of a thermal switch to determine its accuracy. In some uses, a reference thermometer is inserted within the receiver along with the thermometer or switch being calibrated, and the readout of the reference thermometer is used for calibration purposes.

A ventilation system cools the housing in which the receiver is mounted in order to avoid damage to the housing and electronic components of the drywell. The ventilation system typically directs air upward through the drywell in order to avoid excessive heating of a support surface. Often, the vented air heats the probe to the point that it can no longer be comfortably or safely handled by an operator.

Some operators will wrap foil around the probes to reduce heating of the probe. Others will put a set of baffle plates having an opening for the probe on top of the drywell. The plates are expensive to manufacture and complicate set-up and storage of the drywell. In use, the plates may become hot and unsafe for use. Inasmuch as they are not contained within the housing of the drywell, operators risk burns from handling the plates. The plates also interfere with proper venting of the drywell 10. Improper venting causes variation from the calibrated operating condition of the drywell resulting in measurement errors. Improper venting may also damage heat sensitive components.

In view of the foregoing it would be an advancement in the art to provide an improved method for venting a drywell to avoid heating the probe.

SUMMARY OF THE INVENTION

In one aspect of the invention a drywell includes a receiver for receiving a temperature probe. The receiver has upper and lower ends and an inner shield positioned around the receiver to define a first air channel extending between the upper and lower ends. A heating element is positioned in thermal contact with the receiver to heat the receiver to a specified temperature. A flow plate is positioned above the upper end of the receiver and extends outwardly from the receiver. The flow plate defines a plate opening positioned over the receiver opening and has a lower surface sloping away from the receiver with distance above the receiver. A blower positioned below the lower end of the receiver induces air flow through the air channel. The lower surface of the flow plate directs the air flow away from the temperature probe. A housing may surround the inner shield to define a second air channel therebetween. The blower may induce air flow through the second air channel. The air flow from the first and second channels mixes above the upper end of the receiver.

DETAILED DESCRIPTION OF PREFERRED EMBODIMENTS

Figure 1:
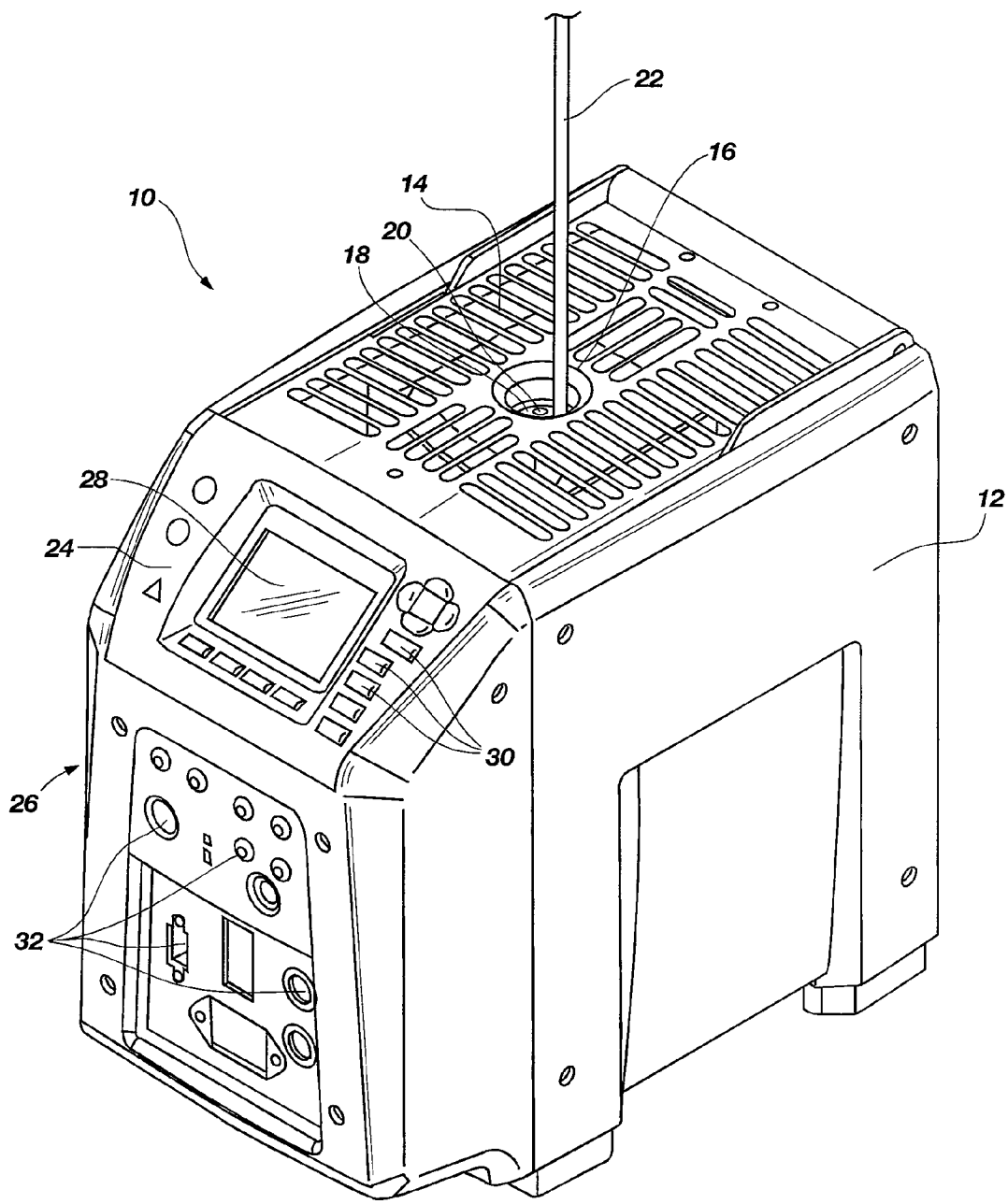
FIG. 1 is an isometric view of a drywell in accordance with an embodiment of the present invention.

Referring to FIG. 1, a drywell 10 according to an embodiment of the invention may include a housing 12. A vent plate 14 may be secured near the top of the housing 12 and permit air to flow out of the drywell 10. The vent plate 14 defines an aperture 16 positioned over a receiver 18. The receiver 18 includes one or more apertures 20 sized to receive the probe 22 of a thermometer, thermal switch, or the like. In use, the temperature of the receiver 18 is elevated to a specified temperature in order to test the thermal response characteristics and accuracy of the device being tested. A heating element in thermal contact with the receiver 18 may be used to control the temperature of the receiver 18.

The drywell 10 may include a control module 24 secured thereto. Alternatively, the control module 24 is remote from the drywell 10 and coupled to the drywell 10 by wires or other communication means. The control module 24 may include an interface 26 for interacting with the drywell 10. The interface 26 may include a display 28, input buttons 30, and ports 32 for coupling thermometers, thermal switches, and the like to the control module 24 for testing.

Figure 2:
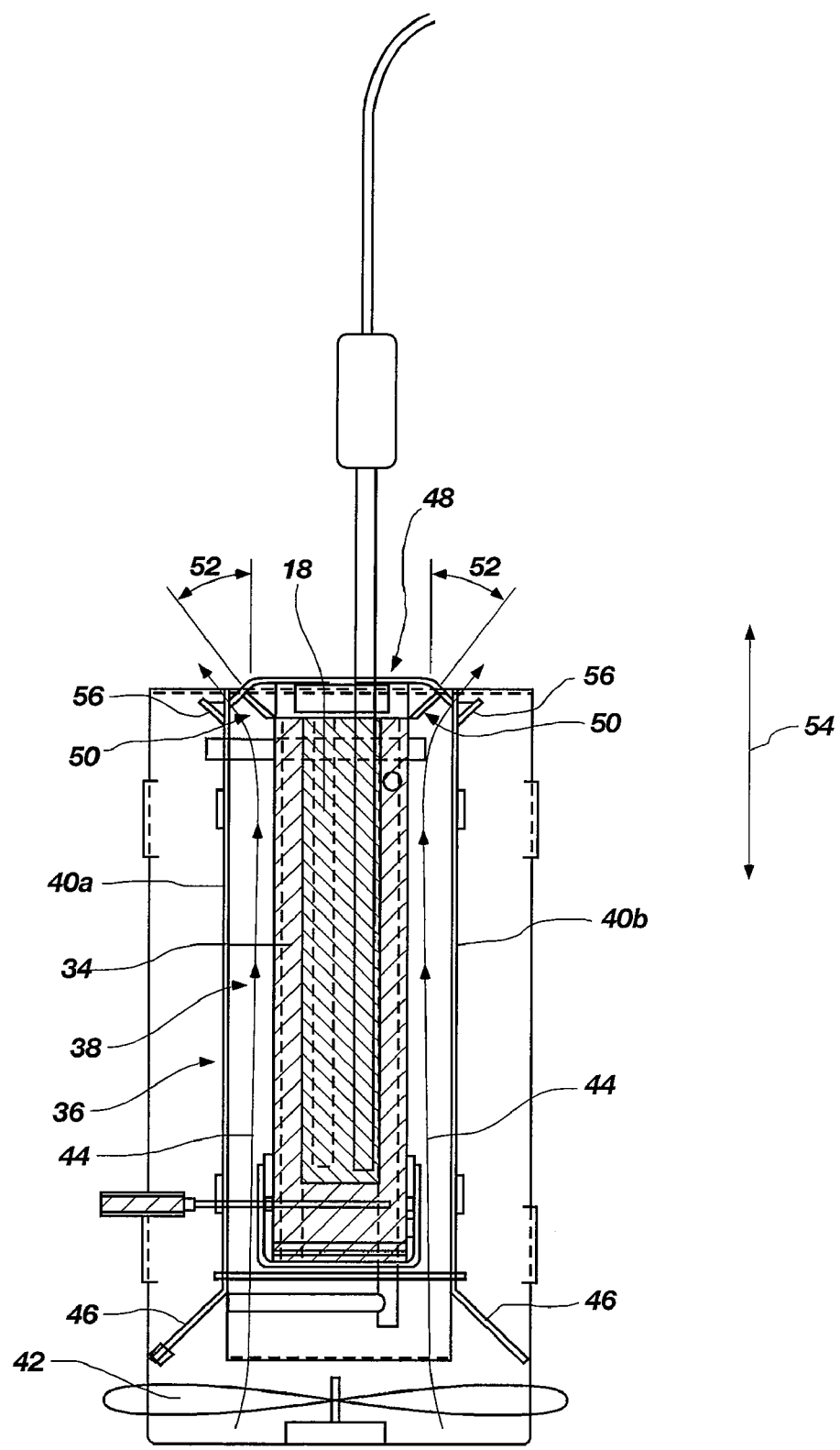
FIG. 2 is a side cross sectional view of a drywell in accordance with an embodiment of the present invention.
Figure 3:
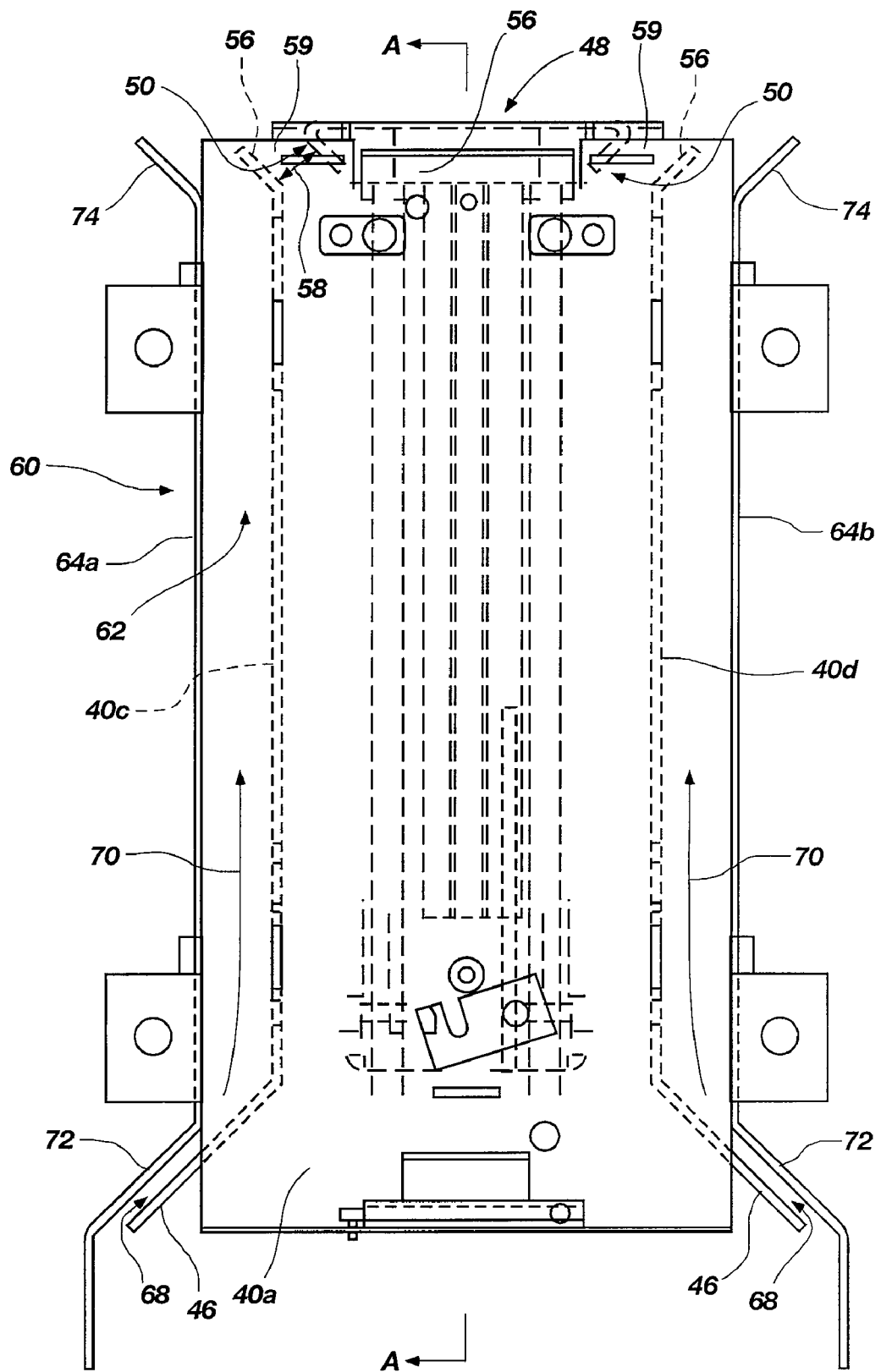
FIG. 3 is a front elevation view of a drywell in accordance with an embodiment of the present invention.

Referring to FIGS. 2 and 3, in some embodiments, the receiver 18 is substantially cylindrical and is inserted within a heater 34. An inner shield 36 may be positioned around the heater 34 and receiver 18 and define an air channel 38. In the illustrated embodiment, the inner shield 36 includes sides 40a-40d arranged to form a box around the heater 34. A fan 42 may be positioned below the inner shield 36 to induce airflow 44 up through the air channel 38. The walls 40a, 40c may include flared portions 46 to guide airflow from the fan 42 into the air channel 38. In the illustrated embodiment, only walls 40a, 40c are flared. However, in some embodiments each of the walls 40a-40d includes flared portions 46.

A flow plate 48 is positioned over the receiver 18 and includes one or more sloped lower surfaces 50. The lower surfaces 50 preferably slope outwardly from the receiver 18 with vertical distance from the upper end of the receiver 18. The lower edges of the lower surfaces 50 may be located immediately above the upper end of the receiver 18. However, in a preferred embodiment the lower surface 50 does not touch the receiver 18 or the heater 34.

In the illustrated embodiment, the lower surface 50 projects across the air channel 38 and includes a portion at an angle 52 relative to a vertical direction 54 extending between the upper and lower ends of the receiver 18. The angle 52 may be effective to cause airflow 44 to be directed away from the probe 22 sufficiently to overcome convective effects that would tend to draw hot air toward the probe 22. In one embodiment, the angle 52 is between about 25 and 45 degrees. In another embodiment, the angle 52 is between about 30 and 40 degrees. In the preferred embodiment, the angle 52 is about 35 degrees. The flared upper portions 56 may be angled such that the distance 58 between the flared upper portions 56 and the lower surface 50 is substantially constant over a substantial area of the flared upper portions 56 and the lower surface 50. Maintaining a substantially constant distance 58 may beneficially reduce back pressure as the airflow 44 passes between the lower surface 50 and the flared upper portions 56. In an alternative embodiment, the distance 58 increases with upward distance from the receiver such that the airflow 44 encounters a slightly divergent channel. The walls 40a, 40c may include vertical portions 59 adjacent the flared upper portions 56. The vertical portions 59 may advantageously limit the amount of hot air directed at an operator.

In some embodiments, an outer shield 60 is positioned around the inner shield 36 and defines an outer air channel 62. The outer shield 60 may include sides 64a, 64b to which the inner shield 36 secures. In one embodiment the sides 64a, 64b include a lower flared portion 72. A gap 68 may be present between the lower flared portion 72 and the lower flared portion 46 of the inner shield 36 such that there is some airflow 70 around the outside of the inner shield 36. The sides 64a, 64c may further include upper flared portions 74. The upper flared portions 74 may have a substantial area thereof substantially parallel to the upper flared portion 56 of the sides 40a, 40c.

Figure 4:
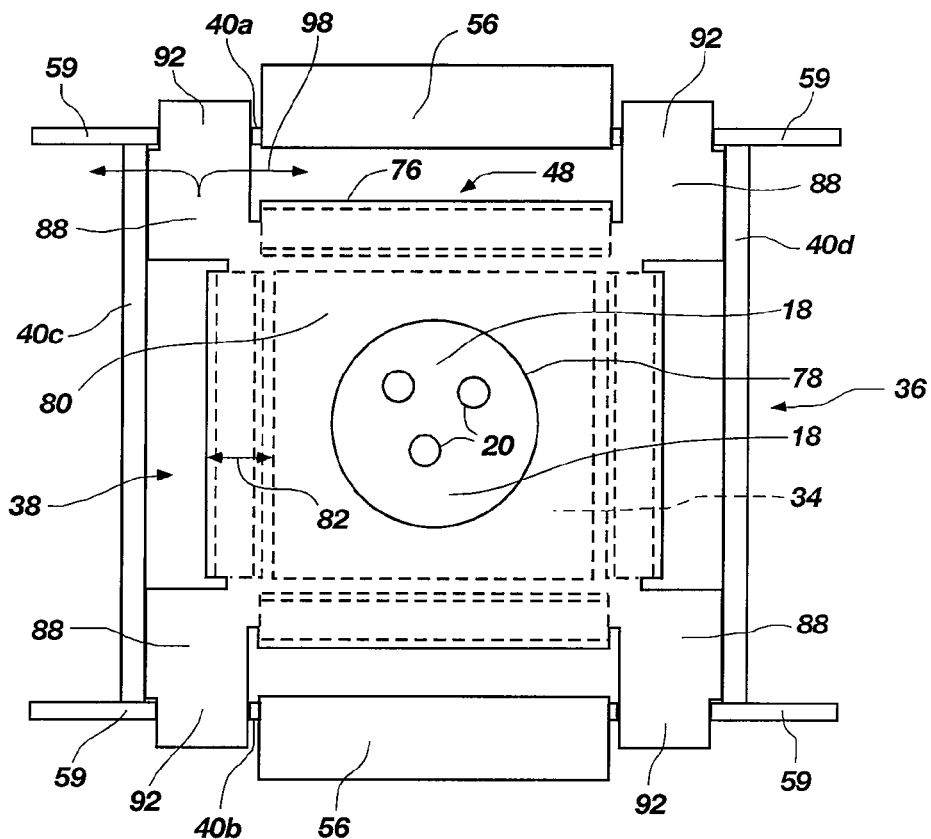
FIG. 4 is a top plan view of a flow plate and inner shield in accordance with an embodiment of the present invention.

Referring to FIG. 4, in some embodiments, the flow plate 48 includes a central plate 76 positioned above the receiver 18. The central plate may include an aperture 78 proximate the center thereof. In the illustrated embodiment the aperture 78 has a diameter approximately that of the cylindrically shaped receiver 18. An area 80 surrounding the aperture 78 may be substantially continuous, without apertures or other perforations therein. The area 80 may extend from the aperture 78 a distance 82 horizontally across the air channel 38. In some embodiments, the distance 82 is equal to about 30 to 60 percent of the width of the air channel 38. In a preferred embodiment, the area 80 extends across about 45 to 55 percent of the air channel 38.

Figure 5:
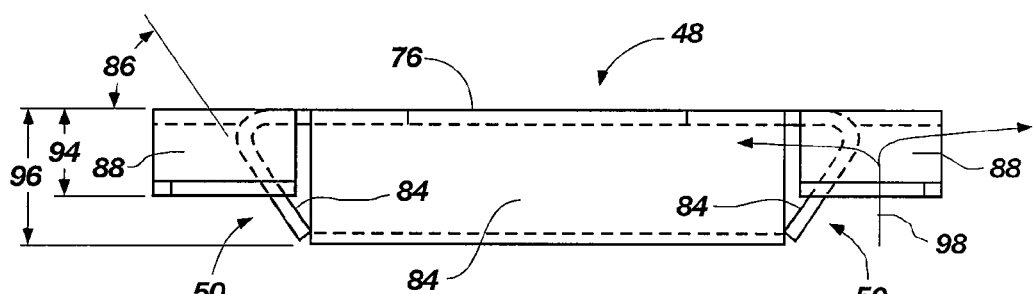
FIG. 5 is a front elevation view of a flow plate in accordance with an embodiment of the present invention.
Figure 6:
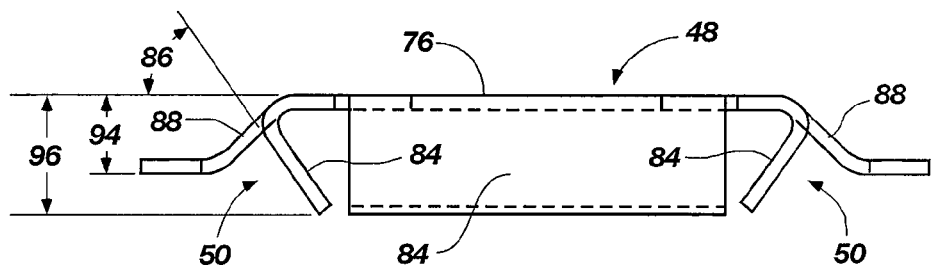
FIG. 6 is a side elevation view of a flow plate in accordance with an embodiment of the present invention.

Referring to FIGS. 5 and 6, while still referring to FIG. 4, the sloped lower surfaces 50 may be formed by flanges 84 extending downwardly from the central plate 76 and inwardly toward the receiver 18. The flanges 84 are angled relative to the central plate 76 at an angle 86. In one embodiment, the angle 86 is between about 45 and 65 degrees. In another embodiment, the angle 86 is between about 52 and 58 degrees. In a preferred embodiment, the angle 86 is about 55 degrees.

Supports 88 may be secured to the central plate 76 between the flanges 84 and secure the central plate 76 to the inner shield 36. In the illustrated embodiment, the supports 88 extend from the corners of the central plate 76. Tabs 92 may be secured to the supports 88 and be insertable within apertures in the sides 40a, 40b to retain the flow plate 48. In the illustrated embodiment, the tabs 92 are inserted within the vertical portions 59 of the sides 40a, 40b, adjacent the flared upper portion 56. The tabs 92 may be narrower than the supports 88 such that the apertures in the walls 40a, 40b may be sized to receive the tabs 92 but prevent insertion of the supports 88.

In some embodiments the supports 88 vertically offset the central plate 76 a distance 94 from a point of securement to the inner shield 36. For example, in the illustrated embodiment, the supports 88 are angled relative to the tabs 92 and central plate 76 such that the tabs 92 are offset vertically below the central plate 76. In some embodiments, the offset distance 94 is equal to about 20 to 60 percent of the vertical extent 96 of the lower surfaces 50. In another embodiment, the offset distance 94 is equal to about 40 to 55 percent of the vertical extent 96.

Figure 7:
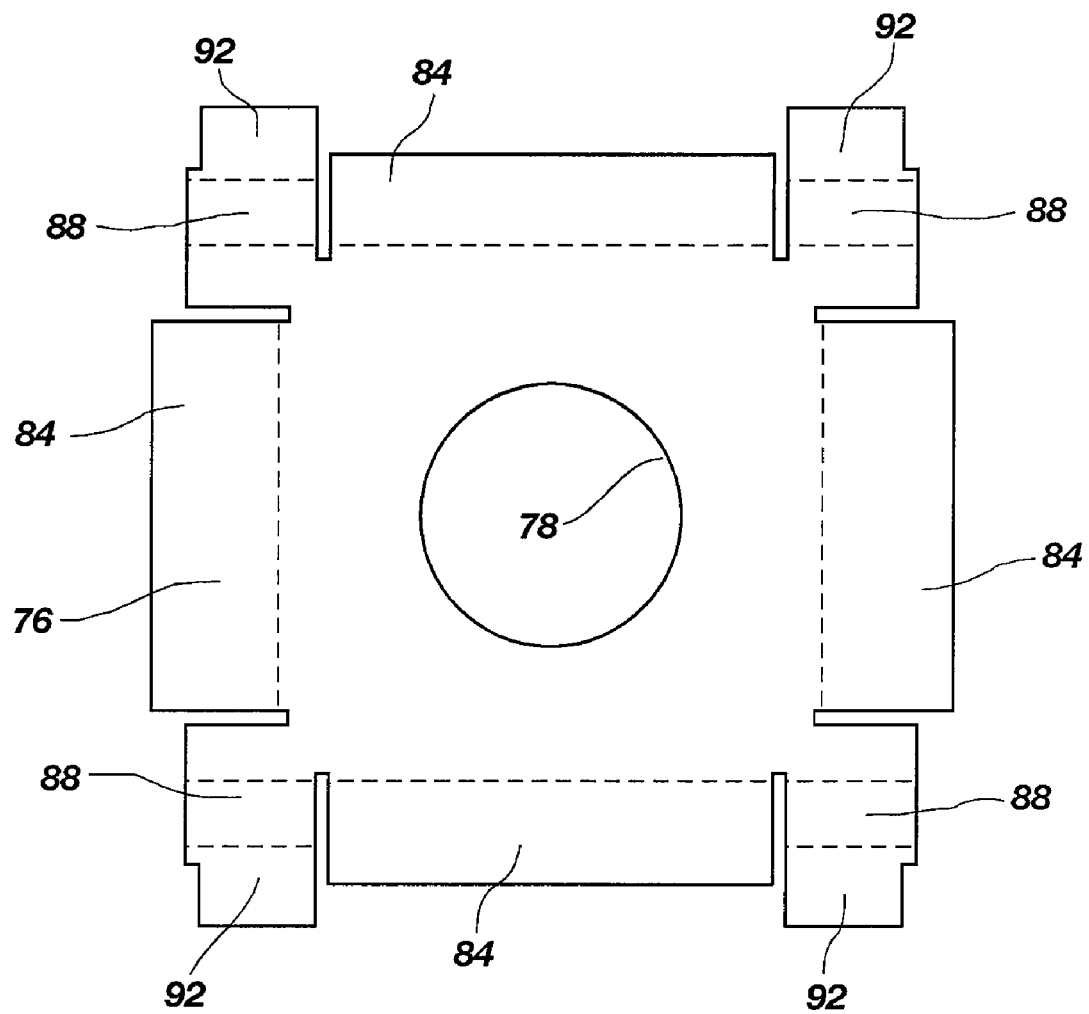
FIG. 7 is a top plan view of a plate shaped for deformation into a flow plate in accordance with an embodiment of the present invention.

In the illustrated embodiment, the tabs 92 are secured to the walls 40a and 40b. The supports 88 therefore extend from the central plate to the walls 40a and 40b and reduce the amount of airflow outwardly from the walls 40a and 40b. As is apparent in FIG. 5, airflow 98 incident on the supports 88 is directed laterally, relative to the walls 40a, 40b. Inasmuch as the wall 40a faces the control module 24, the arrangement disclosed reduces the amount of hot air directed at the operator of the drywell 10. Referring to FIG. 7, in some embodiments, the central plate 76, flanges 84, supports 88, and tabs 92 are formed in a monolithic steel plate that is bent into the shapes of FIGS. 4, 5, and 6.

Figure 8:
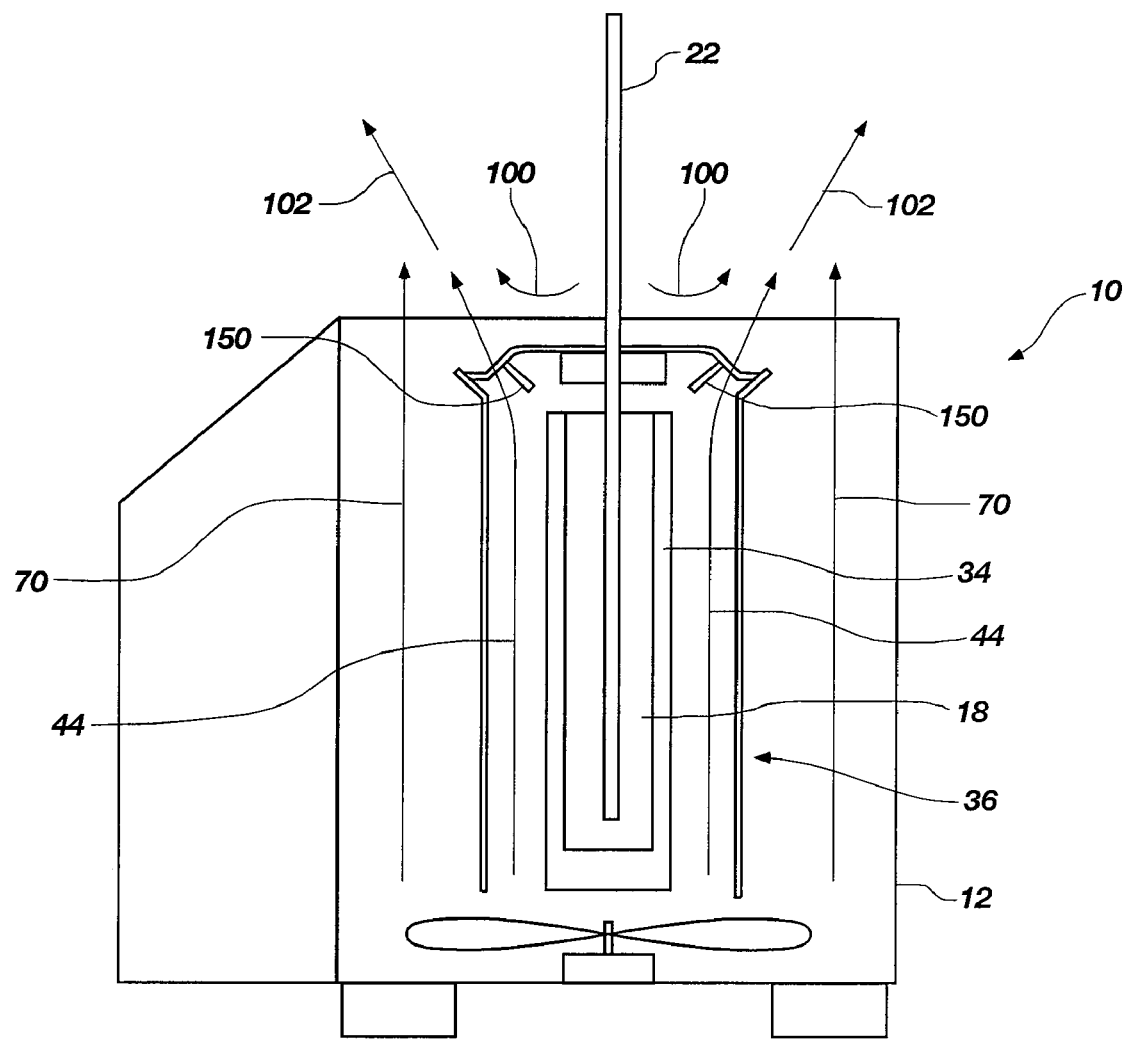
FIG. 8 is a side cross sectional view of a drywell illustrating airflow within the drywell in accordance with an embodiment of the present invention.

Referring to FIG. 8, airflow through the drywell 10 may occur as illustrated. The airflow 44 passing between the inner shield 36 and the heater 34 is redirected by the lower surface 150 such that it is directed away from the probe 22. The airflow 44 mixes with the cooler airflow 70 from between the inner shield 36 and the housing 12. Inasmuch as the airflow 44 is moving at a higher velocity than the surrounding air, it will have lower pressure and may tend to induce airflow 100 away from the probe 22, further reducing heating of the probe 22. A combined airflow 102 is therefore directed away from the probe 22 and includes a mixture of cooler airflows 100 and 70 to reduce the temperature of the airflow 44.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A drywell comprising:
 a receiver having an upper end and a lower end the upper and lower ends defining a first direction, the receiver defining a receiver opening in the upper end thereof for receiving a probe;
 a heater having a heating element in thermal contact with the receiver;
 a shield surrounding the heater and extending from proximate the lower end to proximate the upper end, the heater and shield defining an air channel extending between the heater and shield, the air channel having an outlet proximate the upper end, the outlet structured to direct air upwardly and outwardly away from the receiver opening; and
 a blower positioned below the lower end of the receiver for directing air through the air channel.

2. The drywell of claim 1, wherein the air channel is a first air channel, the drywell further comprising a housing surrounding the shield, the drywell further comprising a second air channel between the shield and the housing, the blower positioned to direct air through the first and second air channels.

3. A drywell comprising:
a receiver having an upper end and a lower end the upper and lower ends defining a first direction, the receiver defining a receiver opening in the upper end thereof for receiving a probe;
a heater having a heating element in thermal contact with the receiver;
a shield surrounding the heater and extending from proximate the lower end to proximate the upper end, the heater and shield defining an air channel therebetween;
a flow plate positioned over the receiver and extending outwardly from the receiver perpendicular to the first direction, the flow plate defining a plate opening positioned over the receiver opening, the flow plate having a lower surface projecting across the air channel and sloping away from the receiver with distance from the receiver along the first direction; and
a blower positioned below the lower end of the receiver.

4. The drywell of claim 3, wherein the lower surface is sloped an effective amount to direct airflow through the air channel away from the probe.

5. The drywell of claim 4, wherein the lower surface is sloped an effective amount to direct airflow through the channel away from the probe sufficiently to overcome convective effects tending to draw the airflow toward the probe.

6. The drywell of claim 3, wherein the shield comprises a flared portion proximate the upper end, the flared portion substantially parallel to the lower surface of the flow plate.

7. The drywell of claim 6, wherein a minimum separation between the upper portion and the lower surface is substantially equal a minimum separation between the shield and the receiver between the upper portion and the lower end.

8. The drywell of claim 3, wherein the air channel is a first air channel, the drywell further comprising a housing surrounding the shield, the shield and housing defining a second air channel, the second channel being in fluid communication with the blower and substantially parallel to the first channel along a substantial portion thereof.

9. The drywell of claim 8, further comprising a controller comprising a circuit board bearing a plurality of electronic components, the circuit board being located within the second air channel.

10. The drywell of claim 9, further comprising a vent plate secured to the housing proximate the flow plate, the vent plate defining a plurality of vent openings over the first and second air channels.

11. The drywell of claim 3, wherein the lower surface comprises four angled flanges.

12. The drywell of claim 11, wherein the angled flanges form an angle of about 25 to 45 degrees relative to the first direction.

13. The drywell of claim 12, wherein the angled flanges form an angle of about 30 to 40 degrees relative to the first direction.

14. The drywell of claim 13, wherein the angled flanges form an angle of about 35 degrees relative to the first direction.

15. The drywell of claim 11, wherein the flow plate comprises a central plate having a substantially rectangular perimeter and wherein the angled flanges secure to edges of the central plate, the top plate further comprising a plurality of supports each securing to the central plate proximate a corner thereof and to the shield.

16. The drywell of claim 15, wherein the supports secure to the housing at a point of securement offset from the central plate along the first direction.

17. The drywell of claim 15, wherein the point of securement is closer along the first direction to the second end than the central plate.

18. A method for directing air through an air channel between a heater and a shield, the method comprising:
inducing a first air flow in the air channel, the heater having an upper end and a lower end, the upper and lower ends defining a first direction, the heater surrounding a receiver defining a receiver opening in the upper end thereof to receive a probe inserted therein, the shield surrounding the heater and extending from proximate the lower end to proximate the upper end to form an air outlet proximate the upper end;
supplying power to a heating element in thermal contact with the receiver; and
directing the first air flow outwardly from the air outlet and away from the receiver opening.

19. The method of claim 18, wherein the air channel is a first air channel, the method further comprising inducing a second air flow within a second air channel extending between the upper and lower ends and located between an outer housing and the shield and mixing the first and second air flows above the upper end.

20. The method of claim 19, further comprising mixing the first and second air flows above the upper end.

21. The method of claim 18, wherein directing the first air flow outwardly from the air outlet and away from the receiver opening comprises directing the first air flow against a flow plate positioned over the receiver and extending outwardly from the receiver perpendicular to the first direction, the flow plate defining a plate opening positioned over the receiver opening, the flow plate having a lower surface sloping away from the receiver with distance from the receiver along the first direction, the lower surface.

22. The method of claim 21, wherein the flow plate does not contact the receiver.

23. The method of claim 21, wherein the lower surface is sloped an effective amount to direct the first airflow away from the probe.

24. The method of claim 23, wherein the lower surface is sloped an effective amount to direct airflow through the channel away from the probe sufficiently to overcome convective effects tending to draw the airflow toward the probe.

25. The method of claim 21, wherein the lower surface comprises four angled flanges.

26. The method of claim 25, wherein the angled flanges form an angle of about 25 to 45 degrees relative to the first direction.

27. The method of claim 26, wherein the angled flanges form an angle of about 30 to 40 degrees relative to the first direction.

28. The method of claim 26, wherein the angled flanges form an angle of about 35 degrees relative to the first direction.

* * * * *

UNITED STATES PATENT AND TRADEMARK OFFICE
CERTIFICATE OF CORRECTION

PATENT NO. : 7,785,000 B2  Page 1 of 1
APPLICATION NO. : 11/853724
DATED : August 31, 2010
INVENTOR(S) : Kyle D. James, Scott M. Hampton and Michael W. Hirst It is certified that error appears in the above-identified patent and that said Letters Patent is hereby corrected as shown below:

| Column, Line | Reads | Should Read |
|---|---|---|
| Column 3, Line 32 | "64a, 64c may" | --64a, 64b may-- |
| Column 4, Line 47 | "a lower end" | --a lower end,-- |
| Column 5, Line 2 | "a lower end" | --a lower end,-- |

Signed and Sealed this

Sixteenth Day of November, 2010

David J. Kappos
*Director of the United States Patent and Trademark Office*